Jan. 27, 1942. R. H. GODDARD 2,271,224
PARACHUTE ATTACHMENT FOR AIRCRAFT
Filed June 17, 1938
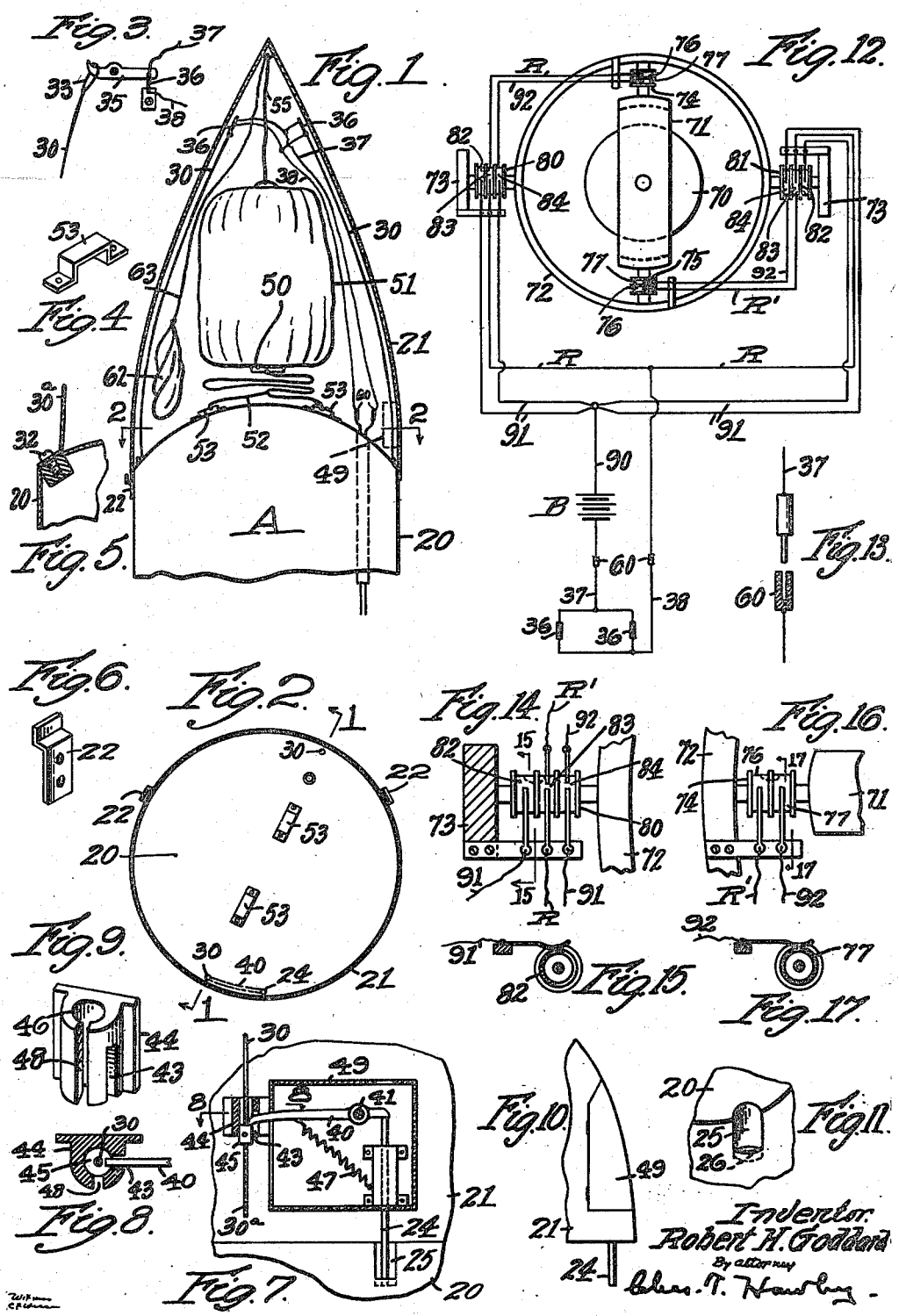

Patented Jan. 27, 1942

2,271,224

UNITED STATES PATENT OFFICE 2,271,224

PARACHUTE ATTACHMENT FOR AIRCRAFT

Robert H. Goddard, Roswell, N. Mex.

Application June 17, 1938, Serial No. 214,267

12 Claims. (Cl. 244—139)

This invention relates to aircraft used in high altitude exploration and relates particularly to rockets and rocket planes thus used. Such aircraft are sent to great heights by the propelling force of the fuel consumed, and commonly continue their upward flight until the fuel supply is exhausted. As the aircraft, as well as the recording instruments carried thereby, are quite expensive, it is essential that the craft and instruments be landed safely and without shock.

It is the general object of my invention to provide a parachute attachment for such aircraft, and a further object is to provide means for releasing the parachute at or near the highest point of flight of said craft.

My invention further relates to arrangements and combinations of parts which will be hereinafter described and more particularly pointed out in the appended claims.

A preferred form of the invention is shown in the drawing, in which

Fig. 1 is a partial plan view of an aircraft having my invention applied thereto;

Fig. 2 is a sectional end view, taken along the line 2—2 in Fig. 1;

Figs. 3, 4, 5 and 6 are detail views to be described;

Fig. 7 is a sectional side elevation of certain releasing mechanism;

Fig. 8 is a sectional end view, taken along the line 8—8 in Fig. 7;

Fig. 9 is a perspective view of a part shown in Fig. 8;

Figs. 10 and 11 are detail views to be described;

Fig. 12 is a plan view of a gyroscope device and certain electric circuits controlled thereby;

Fig. 13 is a side elevation, partly in section, of a detachable connection;

Fig. 14 is a plan view of one of the gyroscope commutators and connections;

Fig. 15 is a transverse sectional view, taken along the line 15—15 in Fig. 14;

Fig. 16 is a plan view of another gyroscope commutator and connections; and

Fig. 17 is a transverse sectional view, taken along the line 17—17 in Fig. 16.

Referring to the drawing, I have shown a portion of a casing 20 of a rocket plane or other aircraft A, and I have shown a substantially conical auxiliary casing 21 mounted at one end of the craft A.

The casing 21 has a three-point support on the end of the casing 20, as the open end of the casing 21 rests on a pair of spaced brackets 22 (Figs. 2 and 6) on the casing 20 and also rests on a plunger 24 (Fig. 7) which extends into an open socket 25 (Fig. 11) located in the edge of the casing 20. The socket is provided with an outer flange 26 at its bottom end to prevent lateral displacement of the plunger.

The casing 21 is secured in position on its three-point support by connecting members 30, the upper portions of which are preferably rigid but the lower portions of which should be flexible, as indicated at 30ª in Fig. 7. The lower portions 30ª are secured to the end of the casing 20, as indicated at 32 in Fig. 5, and the upper ends of the connections 30 are provided with loops 33 (Fig. 3) which are held on the up-turned ends of triggers 35, mounted in the outer end of the casing 21 and maintained in holding position by links 36. Wires 37 and 38 are connected to the opposite ends of the links. If an electric current is passed through the wires and links, the links 36 will be melted or consumed, releasing the triggers 35 and the connections 30 by which the casing 21 is held in position on the craft A.

The plunger 24 (Fig. 7) is held in supporting position by a lever 40 pivoted at 41 to the casing 21. The outer end of the lever 40 extends through a slot 43 (Figs. 8 and 9) in the side of a guide block 44 which is also secured to the side of the casing 21.

A collar 45 is secured on the flexible lower portion 30ª of one connection 30 and is freely slidable through an opening 46 in the block 44. The end of the lever 40 rests on the collar 45 when the parts are in normal position, as shown in Fig. 7, and thus prevents upward movement of the plunger 24. When the connection 30 is released, a spring 47 (Fig. 7) swings the lever 40 downward, thus releasing the plunger 24.

This permits the casing 21 to rock about its points of support on the brackets 22 and such rocking movement is produced by the strong air pressure against the front of the casing. As soon as the casing 21 is thus angularly displaced, the air pressure will act on said casing at one side of its center and will quickly dislodge it from the end of the aircraft A.

The block 44 has a longitudinal slot 48 (Figs. 8 and 9) so that the connection 30—30ª may slip out of the block 44 as the casing 21 is dislodged. A suitable cover 49 (Figs. 7 and 10) is provided for the plunger releasing apparatus, so that the parachute connections may not become entangled therewith. In order that the wires 37 and 38 may be readily disconnected, I provide jacks 60

(Figs. 12 and 13) which will readily pull apart as the casing is dislodged.

A parachute 50 is packed within a bag 51 and is connected by a strong cable 52 to straps 53 (Figs. 1 and 4) mounted on the end of the casing 20. The bag 51 is connected by a cord or cable 55 to the tip end of the casing 21, so that as the casing 21 is dislodged, the bag 51 will be pulled off of the parachute 50, which thereupon opens and controls the descent of the aircraft A.

In order to prevent injury to the casing 21 and parts associated therewith, I preferably provide a small auxiliary parachute 62 (Fig. 1) connected by a cord 63 to the point of said casing and adapted to control the descent of the casing 21. As this casing 21 is much lighter than the main rocket or aircraft A, it may be desirable to mount certain of the more delicate recording instruments in the casing 21, the descent of which is more easily controlled.

For exploration purposes, it is desirable that the flight of the rocket or other aircraft continue to the greatest possible elevation, and it is also desirable that the parachutes be released as soon as the aircraft starts to fall and before the craft has acquired a high speed of descent or has reached a denser atmosphere.

Accordingly, I provide a gyroscope device which controls the closing of the circuit through the wires 37 and 38 and the releasing links 36. In Fig. 12 I have indicated a gyroscope rotor 70 mounted in an inner gimbal ring 71, which in turn is mounted in an outer gimbal ring 72, supported in bearings in a frame 73 mounted in the aircraft A. Any usual means may be provided for maintaining rotation of the rotor 70.

The axle of the inner gimbal ring 71 is provided with commutators 74 and 75, each containing a segmental commutator element 76 and a full circular commutator ring 77 (Fig. 17). The element 76 and ring 77 of each commutator are electrically connected to each other.

The axle of the outer gimbal ring 72 is provided with commutators 80 and 81, each of which comprises a segmental commutator element 82 (Fig. 15) and two full circular commutator rings 83 and 84. The parts 82 and 83 of each commutator are electrically connected.

The segmental elements 76 and 82 are all angularly adjustable and the two elements in each pair will normally be oppositely displaced from contact position.

The wire 38 (Figs. 1 and 12) previously described is connected through a jack 60 and branch return wires R to brushes engaging the full commutator rings 83 in the commutators 80 and 81, and each ring 83 is also connected by additional brushes and a wire R' to an associated segmental commutator element 76 in one of the commutators 74 and 75.

The wire 37 previously described is connected through its jack 60 to a battery B in the aircraft A, which in turn is connected through a wire 90 and branch wires 91 to brushes engaging segmental commutator elements 82 and additional full rings 84 on the commutators 80 and 81. The full rings 84 are connected by brushes and by wires 92 to the full rings 77 on the commutators 74 and 75.

Assuming that provision is made in the aircraft A for maintaining flight in a fixed direction, which is commonly directly upward for observation or exploration purposes, the operation of the parachute apparatus and gyroscope control is as follows:

The gyroscope is set so that no contact will be made with the segmental commutator elements 76 or 82 so long as flight continues in the selected initial direction. When the rocket or other craft reaches its upper limit, if the flight is vertical, it will start to fall and will begin to turn end-over-end as soon as it reaches a slightly denser atmosphere, if not immediately.

When this turning movement begins, contact will be made with one or the other of the segmental commutator elements 82 or with one or the other of the segmental elements 76, depending on the direction of angular displacement. If contact is made with either element 82 on the outer gimbal ring 72, the circuit will be completed through the associated commutator ring 83 and the return wire R. If, on the other hand, contact is made with one or the other of the segmental commutator elements 76 on the inner gimbal ring 71, the circuit will be completed through the wire 91, ring 84, wire 92, ring 77, segmental element 76, return wire R', ring 83 and return wire R.

In either case, current will flow through the wires 37 and 38 and links 36, melting or fusing the links and releasing the auxiliary casing 21 as previously described.

As soon as the casing is released and swings to one side on withdrawal of the plunger 24, the air pressure then acting at one side of the point of the casing will quickly complete the dislodgment of the casing 21 from the aircraft A.

The segments 76 and 82 at opposite ends of the gimbal axles are oppositely disposed in pairs, so that angular displacement in one direction will cause contact with one segment and in the opposite direction will cause contact with the other segment of each pair.

The advantages of this method of control of the parachutes will be readily apparent. The rocket or rocket ship can be guided automatically with its axis vertical by devices such as are described in my United States Patent No. 1,879,187, or by other suitable devices, and will eventually cease to rise but with its axis still maintained substantially vertical.

If the craft is in relatively dense air when it comes to rest, it will turn end-for-end as soon as it begins to fall, thus automatically releasing the parachutes. If, on the other hand, the craft is in very thin air, it may descend some distance and gain considerable velocity without turning, but as soon as it reaches air of greater density, it will begin to turn end-for-end and the parachutes will be released. A very slight increase in density, however, will produce this result, so that the air will still be too thin to exert a serious or breaking strain on the main parachute as it opens.

Under some circumstances, entire separation of the casing 21 and associated parts from the aircraft A may be unnecessary and these parts may remain loosely attached to the aircraft, so that the smaller parachute 62 may be omitted and the entire apparatus may be landed under the control of the single large parachute 50.

It will also be understood that the flight of the rocket may be in any desired direction and is not necessarily vertical, and that the parachutes will be released when the direction of flight changes substantially, whether said flight is in a vertical direction or at some other angle.

Furthermore, the amount of deviation necessary to effect release of the auxiliary casing and parachute may be varied by angular adjustments of the commutator elements 76 and 82 as described.

Having thus described my invention and the advantages thereof, I do not wish to be limited to the details herein disclosed, otherwise than as set forth in the claims, but what I claim is:

1. In combination, a rocket craft having a stream-lined casing, a portion of which is detachable, a parachute connected thereto and contained within the detachable portion of said casing, and automatic free gyroscopic means effective to release said casing portion and to cause said casing portion to be detached from said craft by external air pressure thereon and to cause said parachute to be thereby freed, all on substantial deviation of said craft in any direction from a predetermined direction of travel, but said automatic means being non-responsive to changes in speed or acceleration.

2. In combination, a rocket craft having a main casing, an auxiliary casing mounted at the front end thereof and axially aligned therewith, a parachute in said auxiliary casing which is connected to said rocket craft, means to hold said auxiliary casing on said rocket craft, and automatic gyroscopic means effective to release and dislodge said casing on substantial deviation of said craft in any direction from a predetermined direction of travel, but said means being non-responsive to changes in speed or acceleration.

3. In combination, a rocket craft having a main casing, a unitary conical auxiliary casing mounted at the front end thereof and having a three-point support thereon, a parachute for said rocket craft releasable by dislodgement of said auxiliary casing means to secure said auxiliary casing in position on said craft, and means to release said casing and to withdraw the support of said casing at one point, whereby said auxiliary casing as a unit will move angularly out of axial alignment with said rocket craft and will be dislodged by unbalanced air pressure thereon.

4. In combination, a rocket craft, a parachute connected thereto, a covering for said parachute mounted substantially in axial alignment with said craft and at the front end thereof, means to remove said covering from said parachute, and a gyroscope connected to automatically effect removal of said covering on substantial deviation of said rocket craft in any direction from its predetermined direction of flight but non-responsive to changes in speed or acceleration.

5. In a rocket craft, a main casing, a substantially conical unitary auxiliary casing, a three-point support for said auxiliary casing on the front end of said main casing, holding means for said auxiliary casing, devices effective to release said holding means and to substantially simultaneously withdraw one point of support of said auxiliary casing, whereby said auxiliary casing as a unit will be angularly displaced and dislodged, and a parachute for said rocket craft which is released by dislodgement of said auxiliary casing.

6. The combination in a rocket craft as set forth in claim 5, in which the holding means includes members destructible by passage of an electric current therethrough, and in which a gyroscopic apparatus is provided which is effective to complete a circuit for such electric current on substantial deviation of said craft from a predetermined direction of travel.

7. The combination in a rocket craft as set forth in claim 5, in which the holding means includes members destructible by passage of an electric current therethrough, and in which a gyroscopic apparatus is provided which is effective to complete a circuit for such electric current on substantial deviation of said craft from a predetermined direction of travel, said gyroscopic apparatus having four commutators each with a segmental commutator element which engages a contact and closes the associated circuit on deviation of said craft from its path of travel in the direction controlled by said commutator element.

8. In combination, a rocket craft having a main casing, an auxiliary casing detachably mounted on the front end of said craft, a parachute connected to said craft and releasable by dislodgement of said auxiliary casing, and a separate parachute permanently attached to said auxiliary casing and operative to support said auxiliary casing when said casing is released from said craft.

9. In combination, a rocket craft having a main casing, an auxiliary casing detachably mounted on the front end of said craft, a parachute connected to said craft, a parachute covering permanently connected to said auxiliary casing and removable from said parachute by dislodgement of said auxiliary casing, and a separate parachute for said auxiliary casing.

10. In combination, a rocket craft, a parachute connected thereto, means to release said parachute, a gyroscopic control apparatus therefor comprising a gyroscope rotor, inner and outer gimbal rings for said rotor, and two separate commutator segments mounted in different angular positions on each gimbal axle, said releasing means also including an electric circuit closable through one of said commutator segments by substantial angular displacement of either gimbal ring and its axle in either direction relative to its support.

11. In combination, a rocket craft having a main casing, an auxiliary casing having a three-point support thereon, and means to release one support, said means comprising a slidable supporting rod, a lever engaging and normally holding said rod from sliding movement, yielding means on said auxiliary casing to move said lever to release said plunger, and releasable means normally preventing such yielding movement.

12. In combination, a rocket craft having a main casing, an auxiliary casing mounted thereon, a parachute in said auxiliary casing which is connected to said rocket craft, means to hold said auxiliary casing at the front end of said main casing and in substantial alignment with the axis of said rocket craft, and means to release and dislodge said casing, said latter means being rendered operative by a falling and turning movement of said craft but being non-responsive to changes in speed or acceleration.

ROBERT H. GODDARD.